United States Patent
Funk

[11] 3,982,789
[45] Sept. 28, 1976

[54] PROCESS AND APPARATUS FOR CONVEYING LARGE PARTICLE MINED COAL, OIL SHALE, ORE, ETC. FROM UNDERGROUND MINES OR FROM STRIP MINES VIA A PIPELINE

[75] Inventor: Erwin D. Funk, Glens Falls, N.Y.

[73] Assignee: Kamyr, Inc., Glens Falls, N.Y.

[22] Filed: July 16, 1974

[21] Appl. No.: 489,038

[52] U.S. Cl. .................. 302/14; 209/17; 209/172.5; 302/15; 302/49
[51] Int. Cl.² ........................... B65G 53/30
[58] Field of Search ............ 209/250, 17, 262, 246, 209/256, 258, 268, 273; 302/14–16, 49, 66; 299/18; 61/11

[56] References Cited
UNITED STATES PATENTS

| | | | |
|---|---|---|---|
| 2,686,085 | 8/1954 | Odell | 302/66 |
| 2,791,471 | 5/1957 | Clancey et al. | 302/66 |
| 3,232,672 | 2/1966 | Gardner | 302/14 |
| 3,371,965 | 3/1968 | MacLellan | 302/14 |
| 3,429,773 | 2/1969 | Richter | 162/237 |
| 3,449,014 | 6/1969 | Roerig | 302/49 X |
| 3,485,534 | 12/1969 | Wanzenberg et al. | 302/11 |

FOREIGN PATENTS OR APPLICATIONS
324,949  6/1970  Sweden

Primary Examiner—Frank W. Lutter
Assistant Examiner—Ralph J. Hill
Attorney, Agent, or Firm—Cushman, Darby & Cushman

[57] ABSTRACT

A process and apparatus for conveying large particle coal, oil shale, ore, etc. from underground or strip mines via a pipeline, said conveying being accomplished by introducing the solid material into a pipeline flowing water, such introduction into the pipeline being on the discharge side of a pump which motivates the flow of water in the pipeline, such introduction being accomplished by a transmission device which transmits the solid material from a low energy water stream to the high energy water stream of the pipeline, said transmission being continuous.

4 Claims, 6 Drawing Figures

PROCESS AND APPARATUS FOR CONVEYING LARGE PARTICLE MINED COAL, OIL SHALE, ORE, ETC. FROM UNDERGROUND MINES OR FROM STRIP MINES VIA A PIPELINE

This invention relates to a method and apparatus for conveying large particle coal, oil shale, ore, etc., from underground mines or strip mines.

The mining of coal or ore and the like from below the earth's surface many times results in drainage of surface water and sub-surface water into the underground mine or into the open pit of strip mines. In underground mines, this water must be pumped out continually to allow mining to proceed. Open pits of strip mines generally do not require water pump out. There are, in some cases, dry underground mines and strip mines. Since water is abundant in some mines it can be used efficiently as a conveying medium for the material mined. The pipeline conveying of mined solids from such underground mines becomes particularly efficient since water must be pumped out as a necessity. Water drainage into underground mines of coal mines, for example, can average as much as 10 tons of water for every ton of coal mined, with reports of as high as 33 tons of water for every ton of coal mined.

Known methods and apparatus for conveying material from the mine seam to the mine shaft for underground mines usually consist of conveyor belts or shuttle cars carrying the mined material through the cut seam. Vertical conveyor buckets or elevators for the shuttle cars move the material up the mine shaft to another conveyor belt for continuation of the transfer to a preparation plant for washing and classifying or to rail cars for transfer to other destinations. In surface of strip mining, the loose material is gathered up by large power shovels and loaded into huge trucks for transfer to the preparation plant or transfer to railcars for other destinations.

The pipelining of solid materials with water is a known practice but is usually limited to small particles less than ½ inch nominal dimension. The technique is generally called slurry pumping and is performed by centrifugal pumps having, in some cases, impellors coated with rubber to absorb the shock of the particles striking the impellor to reduce abrasive wear. Pumps are available to pump particles in sizes up to one to two inches but difficulties arise when attempting to pump at high pressures, greater than 100 PSIG. Large particles, because of their mass, provide severe wear on impellors when striking the impellor blades. Additionally, this striking force can break up the particles and this breakup can result in large production of fines. For some materials such as coal, the production of fines is not desirable because of later difficulties created when attempting to remove the coal from refuse material, such as shale, and coal used in some commercial processes must not be of fine size.

An object of this invention is to provide a process and apparatus which serves to improve the conveying of coal, oil shale, ore, etc., by using a purely liquid transfer medium, i.e. water, to continuously move the material via a pipe line, said water being, sometimes, associated as a problem to mining because of drainage into the mine. The improvement to some underground mines is most valuable since existing water pumping equipment can be used to accomplish the conveying of the material. The improvement serves to reduce the energy required to move the material and to reduce the cost of conveying equipment.

In accordance with the teachings of the present invention, the above objective is achieved, and the problems of pump damage, intermittent conveyance, and the necessity of complex machinery associated with the prior art methods and apparatus are avoided. According to the process of the present invention, a path of movement of a supply of particles of ore, coal, or the like is established from the point at which they are mined, a flow of liquid is established along a first flow path, coal particles from said supply are continuously entrained in said liquid flowing along said first flow path, a continuous flow of liquid at an energy level greater than the energy level in said first flow path is established along a second flow path, successive volumes of liquid entrained with coal particles are continuously removed from communication with said first flow path, said volumes are continuously communicated with said flow of liquid along said second flow path, and the two flows are combined and the flow is confined to a point of utilization. Means for accomplishing all the above steps are provided, the basic means being well-known in the art and requiring only minor modification to practice the present invention and achieve its improved results.

The process is particularly advantageous in that the flow of water in the two flow paths is free of large particles greater than ¼ inch nominal dimension when being processed by pumps. The technology of pumping solid materials diluted with water is well developed when the particles are less than ½ inch nominal diameter, but when particles are larger the capability of pumping diminishes. The transfer of solid particles into the discharge or high pressure side of the pump allows for conveying of large solids, prevents breakage of the solid as would normally occur in a pump, and reduces abrasive wear on the pump. Another advantage of the present process is that known devices per se are available for performing each step of the combination.

Water is selected as the conveying medium because of its availability; subsequently any loss of water in the process will not present an economics problem to the process. Other liquids can be used to perform as the conveying medium, said liquids constituting a part of this process invention. Additionally, a mixture of water and finely divided particles such as that used in dense medium washers may be used as the conveying media, said mixtures also constituting a part of this process invention. Either of the two, water or dense medium, can be used at the destination of the pipeline to aid in separation of the raw material from refuse or tramp material. As an example, coal is presently washed and separated by either of the two mediums. The washing and separating of coal using water is often performed in a "Rheolaveur" coal launder. The dense medium separation method is a process of mixing water with finely divided shale or magnitite to produce a fluid medium of greater density than the coal, causing coal to float to the top of the medium. An advantage of conveying coal with dense medium would be the preventing of coal settling in the pipeline, by adjusting the medium density to be nearly equal to that of coal or slightly less. If a dense medium is used, recycle to the source of pipelining would be necessary.

Accordingly it is another object of the present invention to provide a combination of known components which will effectively perform the above procedures in accordance with the principles enunciated.

These and other objects of the present invention will become more apparent during the course of the following detailed description and appended claims.

The invention may best be understood with reference to the accompanying drawings wherein illustrative embodiment is shown.

IN THE DRAWINGS

FIG. 5 is an exploded perspective view illustrating certain parts of the transfer device shown in FIG. 4. The present invention for use in underground mines containing large amounts of drainage water, as shown in FIG. 1a, involves a mechanism for conveying the mined material 1 from the mine seam 3 to the mine shaft 5. The mechanism for conveyance may be a shuttle car or, as shown, a conveyor belt 2. The mined material, hereafter to be known as coal for descriptive purposes, is spilled into bin 4 located in the mine sump 6 within the earth 7. Metering device 8, which may be a metering screw, provides for continuous movement of coal from the bin 4 to chute 9 at a controlled rate. Chute 9 is partially filled with water 22. The coal from metering device 8 drops by gravity into the water 22. The coal moves downward by gravity and a slight liquid drawing action into transmission device 10 through port 17 of housing 15 into pocket 14 of rotor 13. Coal particles of a predetermined size are allowed to pass through the pocket 14 and through screen 20 in transmission device port 19, the predetermined size being small enough to pass without difficulty through pump 30 and valve 32. The coal retained in the pocket 14 is sluiced out of the pocket 14 when the rotor 13 is turned to a position where pocket 14 is in the horizontal position, said sluicing being performed by water discharged from Pump 25. The rotor 13 turns continuously. Pump 25 draws water 27 from sump 6 through conduit 26 and discharges the water through transmission device port 18, sluicing coal out of pocket 14, in horizontal position shown by dotted lines, with the water through port 16 into conduit 28 and up conduit 11 out of the mine shaft 5. Conduit 11 may continue on the earth's surface to some predetermined location or it may discontinue at the top of the shaft and discharge the coal and water into a chute, Rheolaveur launder, or conveyor belt 12 as shown in FIG. 1a. Pump 25 must provide sufficient motive force to keep the sump water level from being exceeded by water drainage into the mine, to overcome frictional losses of the transmission device and conduits 28 and 11, and to overcome the water head pressure equal to the height of the mine shaft. The velocity of water in conduits 28 and 11 must be great enough to prevent coal settling. It may be necessary to control pump 25 water output to prevent it from pumping the sump dry. The water flow from pump must be 5 to 10 times greater by volume than the volume rate of coal sluicing. For wet underground mines this amount of water is easily obtained due to drainage into the mine. Thus removal of water in the mine and pipelining of coal are accomplished simultaneously. The preferred transmission device 10 is known per se for use with pulp digesters and is disclosed in Swedish Pat. Nos. 174,094 and 324,949. The transmission device 10 provides for continuous transfer of coal into the discharge side of pump 25. The abilities of continuous transfer will be disclosed in a later detailed description of the device. In the above process the rotor 13 is not in intimate contact with housing 15, thus allowing leakage between these structural parts from the higher pressure water in conduit 28 into the lower pressure chute 9. Chute 9, therefore, is always faced with a surplus of water. Additionally, chute 9 receives a surplus of water from the transmission device as entering coal displaces water in pocket 14. Chute 9 is prevented from overfilling by the drawing of liquid by pump 30 from chute 9 through port 17, pocket 14, screen 20, port 19, conduit 29 to pump 30. The discharge pressure of pump 30 is greater than the water pressure of conduit 28. The amount of water drawn from chute 9 is controlled by level control valve 32 being modulated by level sensor 21. The water flow is then from pump 30, conduit 31, level control valve 32 and conduit 33 into conduit 28 completing the return of surplus water. Should pump 30 fail or screen 20 become clogged, the surplus water will cause the water level in chute 9 to rise to screen 23 and overflow through conduit 24 into sump 6. It will be necessary to manually close level control valve 32 when pump 30 fails to prevent backflow of water through conduit 33. Conduit 24 may be connnected to conduit 26 below the water line to allow overflow to be drawn immediately into pump 25. This may be desirable to prevent fine coal that passes through screen 23 from collecting at the bottom of sump 6. The clogging of screen 20 is counteracted in the same manner as is the failure of pump 30. Filling of pocket 14 will be by gravity only when screen 20 is blocked or pump 30 fails, and correction should be made as soon as possible for proper operation of the device.

Figure 1A:
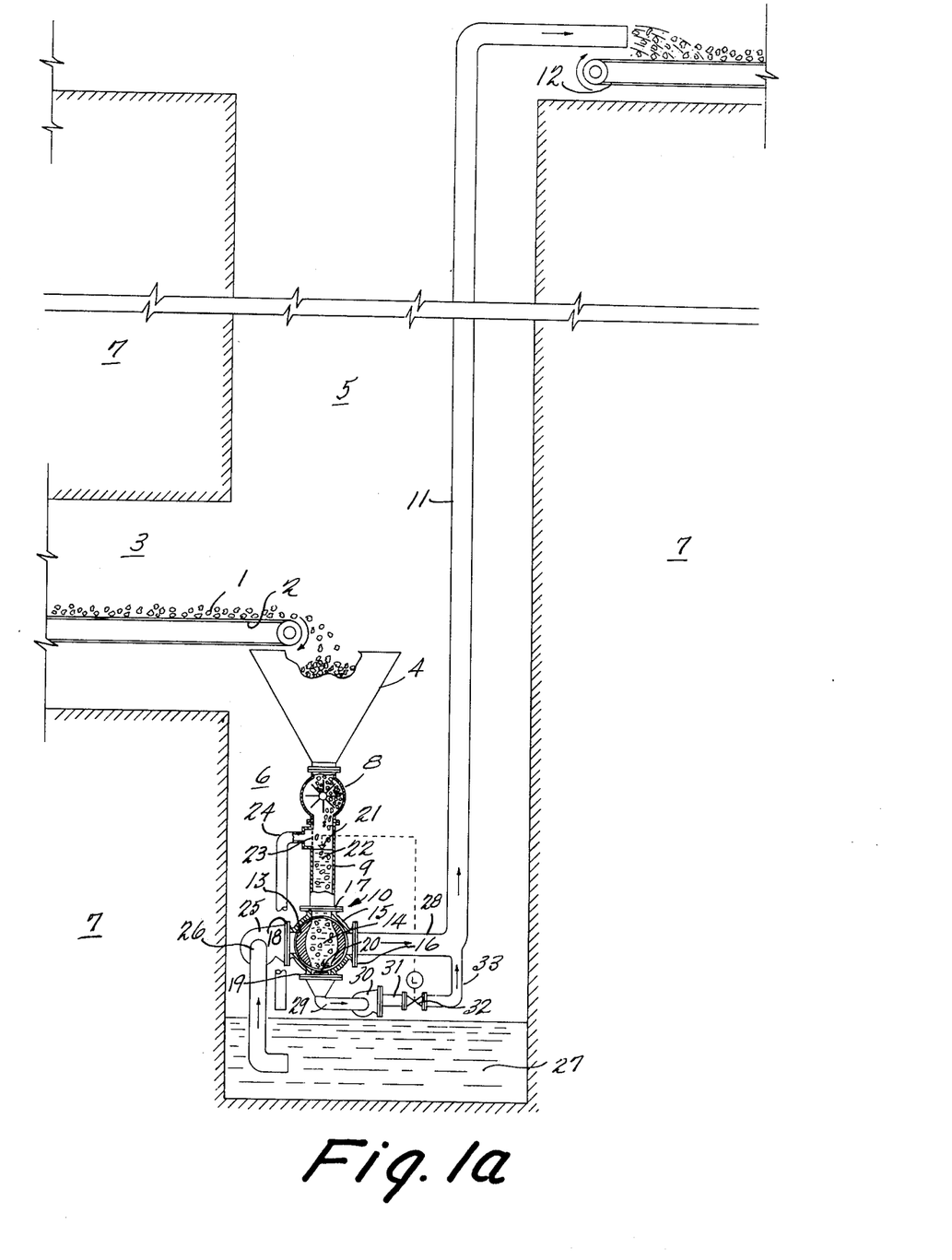
FIGS. 1a and 1b are schematical and somewhat constructional flow diagrams illustrating the procedural steps of the present method and exemplary apparatus for carrying out the procedural steps for conveying solid material from underground mines where an abundance of water is present.
Figure 1B:
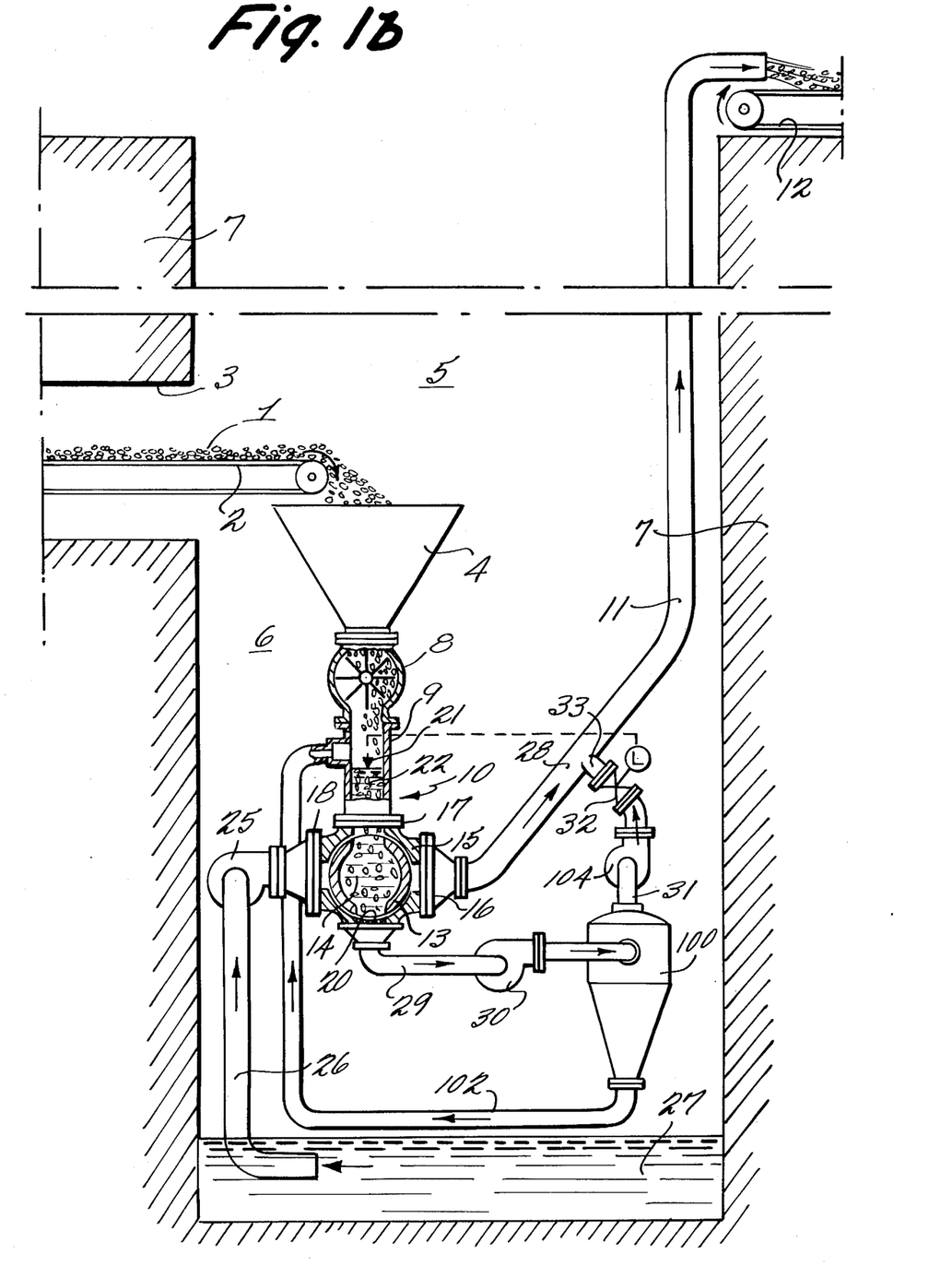

A modification of the apparatus of FIG. 1a is shown in FIG. 1b. This modification is applicable to mines that are 200 or more feet deep since there may be a difficulty in gaining the sufficient pressure rise from pump 30, since it must pump both water and small entrained coal particles against the full pressure of the conduit 28. A separation of the water from the coal particles in conduit 31 will allow another pump to pump only purified water, which allows high head capabilities. In practicing this modification, water and entrained small mined particles from pump 30 are passed into centrifugal clarifier 100. The mined particles are separated from the water in the clarifier and are returned to chute 9 via conduit 102. Purified water is drawn from clarifier 100 through conduit 31 by a pump 104, which then discharges the water into conduit 28 via the same apparatus as is utilized in the FIG. 1a embodiment.

Figure 2:
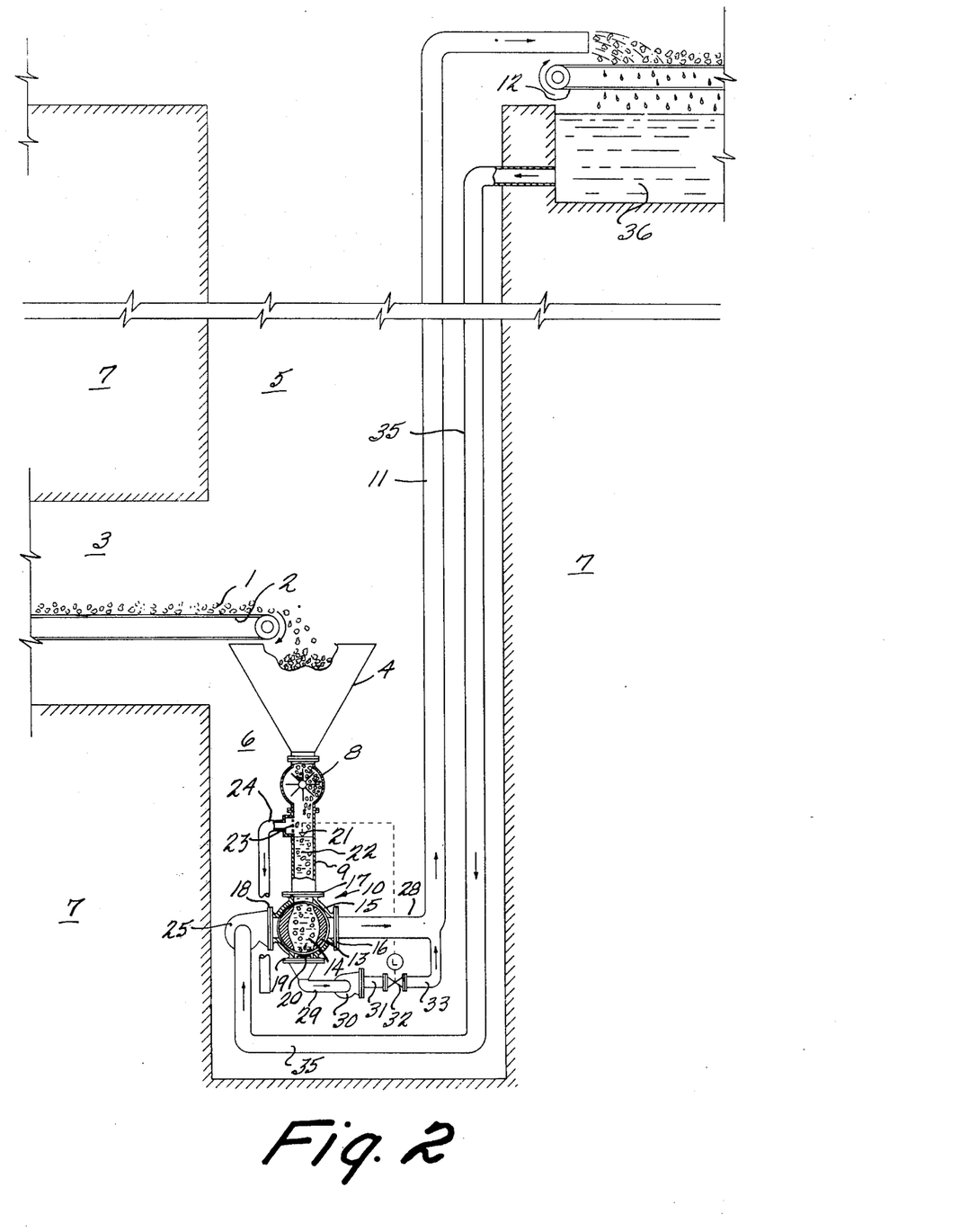
FIG. 2 is a schematic and somewhat constuctional flow diagram illustrating the procedural steps of the present method and exemplary apparatus for carrying out the procedural steps for conveying solid material from underground mines where no drainage water is present.

The pipelining of coal from a dry underground mine may be accomplished by the invention by simple schematic and constructional changes to the system of FIG. 1a as shown in FIG. 2. Rather than drawing water from the sump, the sump is dry most of the time except possibly during heavy rains. Water for accomplishing the conveying of coal is stored in a non-porous earthen reservoir 36 or the like at some point near the mine shaft opening in the earth. Water is pumped to the reservoir from any applicable source such as a stream, lake or river, or is return water after separation from the coal. The water reservoir is connected via a conduit 35 to the inlet or suction of pump 25. Pump 25 now must overcome primarily only friction loss in the pipeline since only a small head pressure of water exists between conduits 28 and 35 at the pump 25 and transmission device 10. The water for pipelining is shown in FIG. 2 as being return water after being separated from the coal at conveyor belt 12. The function of introducing and transmitting coal into the pipeline is identical to the above description for wet underground mines. For the alternative of overflowing water through conduit 24 into sump 6, a sufficiently sized sump pump (not shown) is necessary for pumping of overflow water into conduit 11, or a pump may be connected to conduit 24 to pump the overflow into conduit 11.

Figure 3:
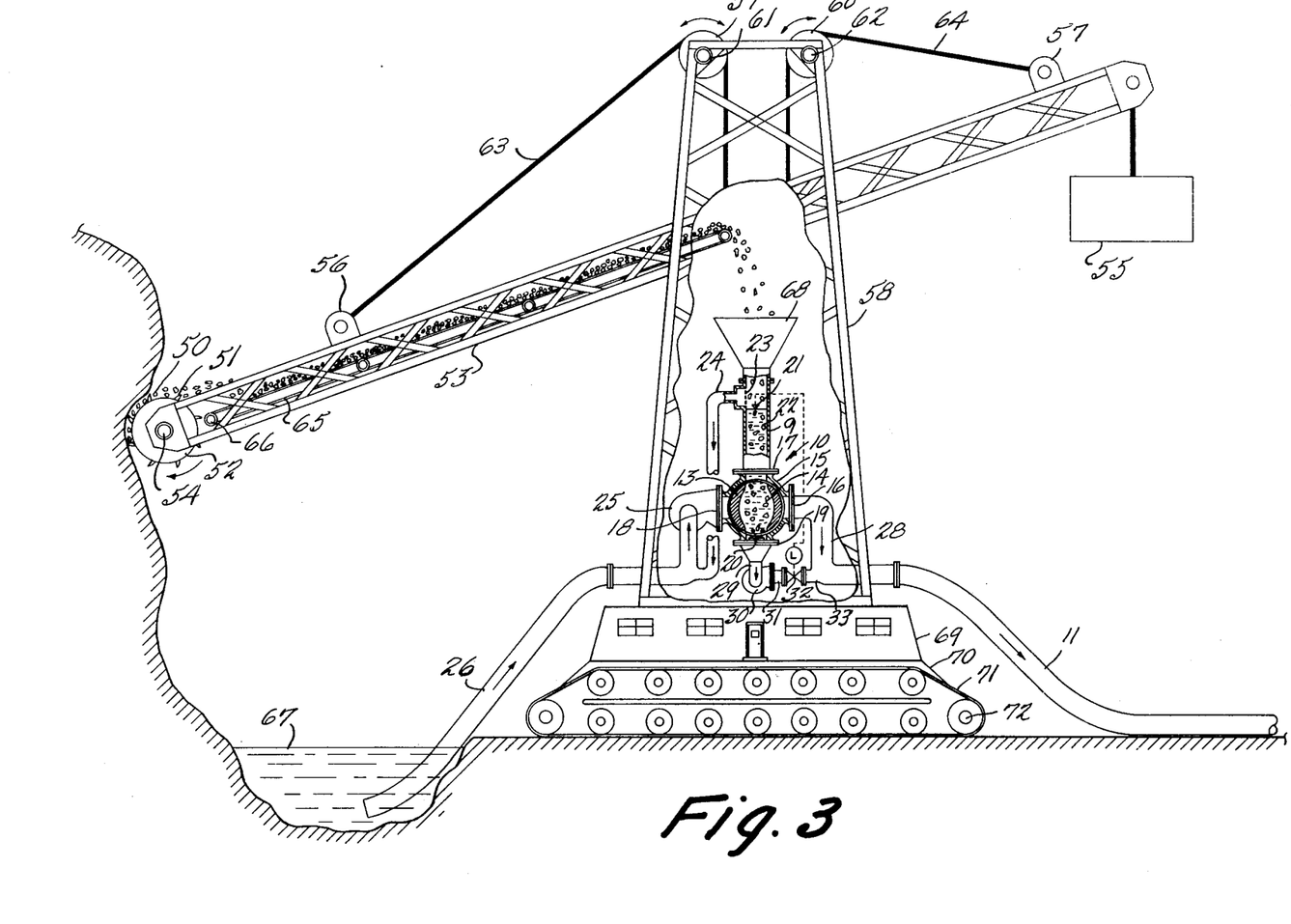
FIG. 3 is a schematical and somewhat constructional flow diagram illustrating the procedural steps of the present method and exemplary apparatus for carrying out the procedural steps for conveying solid material from surface or strip mines where water is or is not present.

The pipelining of coal from strip mines constitutes a part of this invention. FIG. 3 shows somewhat a schematic and constructional form of the method of producing the conveyance of large coal particles in pipelines. This process may be an integral part of the machinery that removes the coal from the strip mine as shown in FIG. 3, or may be a portable unit whose sole purpose is to introduce the coal into the pipeline; in such a case the chute 9 must be accompanied by a bin and metering device for uniform feed rate, said bin normally being filled intermittently by a power shovel. In FIG. 3 is shown a somewhat representative constructional form of the present invention, coal is raked or cut from the earth by a rapidly rotating wheel 52 containing cutting blades 51 for biting or raking the surface coal 50 to be thrown upon conveyor belt 65 driven by rollers 66. The wheel 52 is located on the outboard end of boom 53. The conveyor belt 65 extends from the wheel 52 through boom 53 to near the pivot point of boom 53 with gantry 58. Boom 53 is supported and pivots vertically about a fixed point on gantry 58. The boom 53 is counterbalanced by weight 55. The pivoting of boom 53 allows for vertical movement of wheel 52. Although not constructionally shown in FIG. 1a, the boom is fitted at the pivot point with gearing to extend or retract the boom for horizontal movement. Conveyor belt 65 must likewise be extended or retracted equal to the boom 53. Swing of the boom 53 is obtained by rotation of the gantry 58 about the central axis of the gantry 38, said rotation being performed at the base of control and machine room 69 relative to base 70. The vertical movement of wheel 52 is accomplished by cables 63 and 64 attached to boom 53 at points 56 and 57 respectively. The total length of each cable is controlled in the machine room. The cables 63 and 64 are supported and allowed movement by rollers 59 and 60 supported by bearings 61 and 62 respectively. Since water will be available on the gantry the boom may be always in near equal balance by pumping water into counterbalance 55 or draining water out as the boom is retracted or extended respectively. This weight balance system is not shown in FIG. 3. The gantry is supported and provided movement by tracks 71 propelled by rollers 72, said rollers motivated from machine room 69. The aforementioned structure's primary purpose is to provide a means of continuously supplying coal to the pipelining system and may therefore be of any constructional form to accomplish said means for the purpose of this invention. The schematic form of the equipment initiating the pipeline conveyance of coal is shown in the gantry 58 cutaway of FIG. 3. Coal 50 drops by gravity into funnel 68, said funnel being of rectangular opening to direct coal into chute 9. The rate of coal to funnel 68 is controlled by the cutting rate of wheel 52. A bin and metering device as shown in FIGS. 1a and 2 may be used in place of the funnel if it is not desirable to control the cutting rate of wheel 52. Coal drops into chute 9 which is partially filled with water 22. The remaining description for producing the pipelining of coal is identical to that forr FIG. 1a with the exception of obtaining water from a different source and pumping coal with water in a horizontal rather than vertical conduit. Therefore, referral is made to the description for conveying of material from underground mines with abundance of water, FIG. 1a. The source of water for conveying of coal in a pipeline can be obtained from ditches 67 associated with strip mines were water is abundant or a nonporous earthen reservoir ca be developed for dry strip mines with the water pumped from a stream, lake or river. For dry strip mines water may be returned to the reservoir via a conduit (pipeline) from the coal destination after the coal and water are separated, thereby creating a conservation of water. The water and coal conveyed in pipeline 11 must be moved at sufficient velocity to prevent coal settling. The conduits 26 and 11 must contain flexible sections to allow for short movements of gantry 58 for new locations of coal cutting. Periodically, coal feed must be stopped while water flow is continued until conduit 11 is completely flushed of coal. After flushing of conduit 11, all water flow is stopped, and new sections of conduit 11 and 26 are added to allow the gantry 58 to follow the coal seam. The pipelining of coal is continued after the gantry is repositioned.

Figure 4:
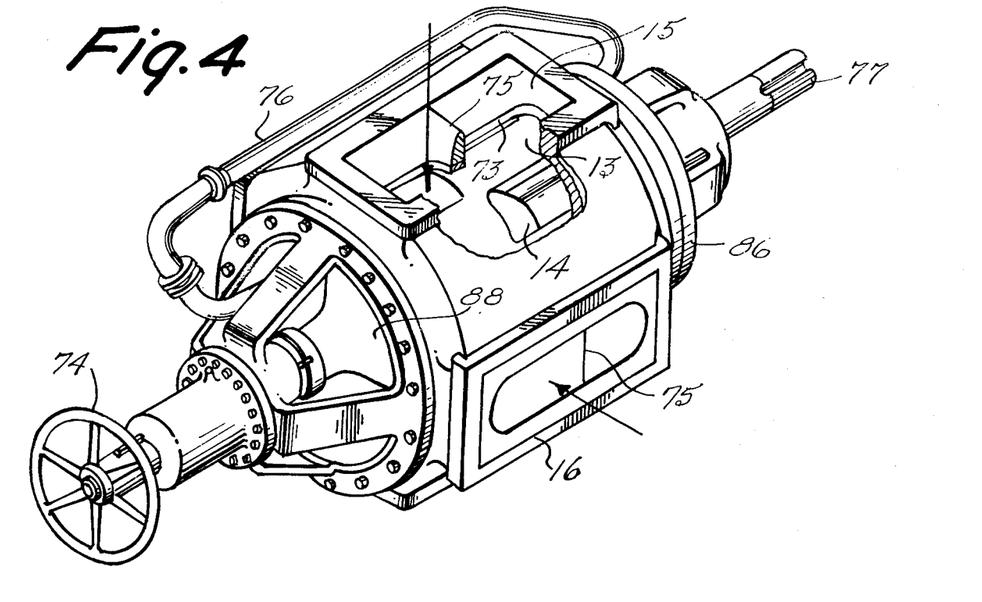
FIG. 4 is a perspective view of the transfer device for carrying out the method of the present invention.
Figure 5:
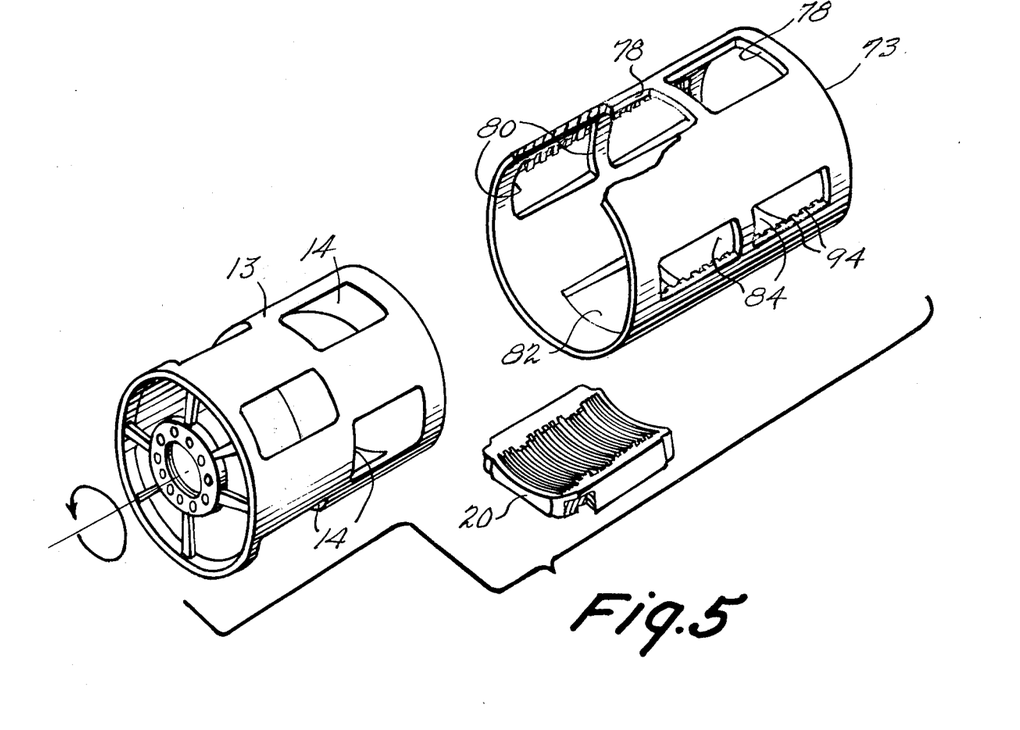

As best shown in FIGS. 4 and 5, the transmission device 10 includes a pocketed rotor 13 containing two rows of diametrically through going pockets 14, each row containing two through going pockets perpendicular to each other presenting four open ports equally spaced around the periphery of the rotor for each row. The two rows of pockets are parallel, one row being 45° displaced peripherally from its adjjacent row as is shown in FIG. 5. The pocketed rotor 13 is encased by housing 15 and mounted for rotation within a housing liner 72. As best shown in FIG. 5, the liner 73 includes four ports, 78, 80, 82 and 84, equally spaced around the periphery of the housing, which register respectively with inlet 17, inlet 18, outlet 19 and outlet 16. Each port is more than twice as wide as the sum of two pockets in the pocketed rotor and a divider 75 is located midway in each housing port to separate the same into two parallel port, as clearly depicted in FIGS. 4 and 5.

The pocketed rotor 13 may be either cylindrical or tapered; illustration of such being shown in FIGS. 4 and 5 as tapered with rotor diameter increasing in the direction of a clearance adjusting hand wheel 74. Tapering of the rotor 13 provides for adjustment of the clearance between the rotor 13 and housing liner 73; additionally, increase in clearance due to wear can be taken up by turning hand wheel 74, pushing rotor 13 toward a shaft drive end 77 shown in FIG. 4. The pockets 14 through rotor 13, in a row, loop over each other so as to provide passage through the rotor while maintaining inline openings in the rotor around the periphery of the rotor. While looping, the pocket becomes narrower but wider, such widening being shown in FIG. 1a; the narrowing being necessary to accomplish the looping over of passages and the widening being provided to maintain a nearly constant pocket cross-sectional area for liquid and coal particle flow.

Coal particles entering the transmission device 10 with liquid through inlet 17 are drawn by gravity and liquid motion provided by pump 30 through ports 78 and 82. A screen 20 is disposed within each port 82 so that the fine coal particles and water pass through each screen 20 but particles of the predetermined size range larger than the screen opening are thus held in the communicating rotor pocket 14. As the filled pocket 14 rotates and begins to approach a position nearly perpendicular to its filling position, water in the discharge flow path from pump 25 is forced through port 80 into the pocket causing discharging of coal particles from the pocket through port 84 into conduit 28. Before the pocket again rotates to the filling position, all coal particles are emptied into conduit 28, leaving only water in the pocket. The pocketed rotor 13 rotation is continuous, but the filling and emptying of pockets in a single row of pockets is intermittent. Since the adjacent parallel row of pockets, displaced 45° peripherally, is also intermittent filling and discharging, the sum of these two intermittent filling and discharging rows of pockets is continuous. The continuous operation is an effect of the peripheral displacement of the two parallel rows of pockets, such displacement being shown in FIG. 5, for as a pocket is closing to a housing inlet port, a pocket is opening to the same port, thus always maintaining a constant open cross-section through the filling ports 78 and 82 and the discharging ports 80 and 84, making the filling and discharging systems continuous.

The transmission device 10 is uniquely characterized by several important internal features. The first of these is the ability to transfer coal particles from one flow path to another flow path at higher pressure without the need for positive sealing surfaces. According to the present invention, the rotating pocketed rotor 13 need not come into intimate contact with the housing liner 73, but may present a clearance therewith Since ports 78 and 82 are at a lower pressure than ports 80 and 84, a leakage occurs in the form of water flow from ports 80 and 84 to ports 78 and 82 through the clearance. The water flow through the clearance is maintained small by maintaining the clearance narrow. The small water flow provides a lubrication and cleaning function which prevents binding of rotor 13 with housing liner 73. Secondly, another unique feature of the transmission device 10 is the retaining of large material by screen 20 while allowing a liquid drawing action. During filling of a pocket 14 in the rotor 13, water is drawn through the peripheral slots in screen 20. The constructional form of the transmission device 10 is such that self-cleaning of the screen 20 is provided, such cleaing being performed by the edge of the rotor pocket as the edge passes over the slots. Thirdly, the liner 73 may be provided with one or more grooves 94 adjacent the port openings 80 and 84, as shown in FIG. 5. The grooves 94 are formed with a peripheral dimension which is greater than the dimension measured in the radial direction, so that a water flow from pump 25 at high pressure into the pocket openings 80 and 84 is exposed to strong choking action. Consequently, shocks and vibrations originating on pocket to port opening are milder, reducing the tendency of coal particles to break. Lastly, the water used as a conveying medium tends to provide two means for preventing cutting of coal particles when the rotating wheel pocket edge closes housing filling port 78 to the rotor pocket with the rotor 13 rotating at a low RPM, preferably 5 to 10 RPM. The water provides some buoyancy to the coal particles since the particles density is preferably only from 1.2 to 1.4 times greater than that of the water. Since the particle density is just slightly greater than the water, the pocket edge will tend to push the particle away rather than pinch or cut off the particle between the pocket edge and the housing filling port edge. As the pocket being filled closes off to the filling port, the pocket in the parallel row of pockets is approaching full open to the filling port so that the majority of water flow is through this pocket carrying most of the particles into this pocket, leaving nearly none to be pinched off by the closing pocket.

A housing equalizing line 76 is provided communicating the housing end bells 86 and 88 for the purpose of equalizing the pressure in the housing end bells to prevent end thrust upon bearings.

A specific advantage of the transmission device is that the pressures at port 80 and 84 are nearly equal and the pressures at ports 78 and 82 are nearly equal, producing nearly no side thrusts on rotor 13 and associated bearings.

While the apparatus and method of the present invention have hbeen disclosed in what is presently conceived to be the most practical and preferred embodiments, it will be apparent to one of ordinary skill in the art that many modifications may be made thereof within the scope of the invention, which scope is not to be limited except by the appended claims.

What is claimed is:

1. A process of continuously conveying mined material such as particles of coal, ore, or the like, from a mine site to a remote point, said process comprising the steps of:

maintaining a flow of liquid along a first flow path from a particles entrainment position through a transfer position to a first pumping position by pumping the liquid at said first pumping position, substantially continuously entraining mined particles from a supply of mined particles in said flow of liquid along said first flow path at said particles entrainment position, maintaining a continuous flow of liquid along a second flow path from a second pumping position through said transfer position to said remote point by pumping said liquid at said second pumping position along said second flow path, substantially continuously removing from communication with said first flow path at said transfer position successive volumes of mined particles larger than a predetermined size entrained in liquid while permitting liquid with mined particles smaller than said predetermined size to flow with liquid along said first flow path downstream of said transfer position to said first pumping position, substantially continuously communicating said successive removed volumes of mined particles and entrained liquid with liquid flowing in said second path at said transfer position, and substantially continuously directing the liquid with mined particles smaller than said predetermined size flowing from said first pumping position into said second flow path.

2. A process of continuously conveying mined material such as particles of coal, ore, or the like, from a supply point such as a mine site to a remote point, said process comprising the steps of:

maintaining a flow of liquid along a first flow path from a particles entrainment position through a transfer position to a first pumping position by pumping the liquid at said first pumping position, substantially continuously entraining mined particles from a supply of mined particles in said flow of liquid along said first flow path at said particles entrainment position, maintaining a continuous flow of liquid along a second flow path from a second pumping position through said transfer position to said remote point by pumping said liquid at said second pumping position along said second flow path, substantially continuously removing from communication with said first flow path at said transfer position successive volumes of mined particles larger than a predetermined size entrained in liquid while permitting liquid with mined particles smaller than said predetermined size to flow with liquid along said first flow path downstream of said transfer position to said first pumping position, substantially continuously communicating said successive removed volumes of mined particles and entrained liquid with liquid flowing in said second path at said transfer position, clarifying the liquid with mined particles smaller than said predetermined size flowing from said first pumping position to obtain a clarified liquid fraction and a liquid fraction with a concentration of said smaller mined particles, pumping said clarified liquid fraction into said second flow path, and returning the liquid fraction with a concentration of said smaller mined particles to said first flow path.

3. Apparatus for continuously conveying mined materials such as particles of coal, ore, or the like from a supply point such as a mine site to a remote point, said apparatus including a transmission device of the type including a housing having a low pressure inlet, a low pressure outlet, a high pressure inlet, a high pressure outlet, screening means in said low pressure outlet, and a rotor mounted for rotation within said housing with its periphery in pressure balanced relation with respect to said inlets and outlets, said rotor having pocket means extending therethrough operable in response to the rotation of said rotor to (1) continuously remove from communication with a flow of liquid and mined particles passing through said low pressure inlet successive volumes of mined particles larger than the size of separation of said screeninng means while permitting liquid with mined particles smaller than the size of separation of said screening means to flow with liquid outwardly of said low pressure outlet and (2) continuously communicate said successive removed volumes of mined particles and entrained liquid with liquid flowing from said high pressure inlet to said high pressure outlet, the improvement in combination therewith which comprises:

means for confining a flow of liquid along a first flow path from a particles entrainment position to said low pressure inlet and from said low pressure outlet to a first pumping position, first pumping means at said first pumping position for maintaining a flow of liquid along said first path, means for substantially continuously entraining mined particles from a supply of mined particles in said flow of liquid along said first path at said particles entrainment position, means for confining a flow of liquid along a second flow path from a second pumping position to said high pressure inlet and from said high pressure outlet to said remote point, second pumping means at said second pumping position for maintaining a flow of liquid along said second path, and means for continuously directing the liquid with said smaller mined particles flowing from said first pumping position into said second flow path.

4. Apparatus for continuously conveying mined materials such as particles of coal, ore, or the like from a supply point such as a mine site to a remote point, said apparatus including a transmission device of the type including a housing having a low pressure inlet, a low pressure outlet, a high pressure inlet, a high pressure outlet, screening means in said low pressure outlet, and a rotor mounted for rotation within said housing with its periphery in pressure balanced relation with respect to said inlets and outlets, said rotor having pocket means extending therethrough operable in response to the rotation of said rotor to (1) continuously remove from communication with a flow of liquid and mined particles passing through said low pressure inlet successive volumes of mined particles larger than the size of separation of said screening means while permitting liquid with mined particles smaller than the size of separation of said screening means to flow with liquid outwardly of said low pressure outlet and (2) continuously communicate said successive removed volumes of mined particles and entrained liquid with liquid flowing from said high pressure inlet to said high pressure outlet, the improvement in combination therewith which comprises:

means for confining a flow of liquid along a first flow path from a particles entrainment position to said low pressure inlet and from said low pressure outlet to a first pumping position, first pumping means at said first pumping position for maintaining a flow of liquid along said first path, means for substantially continuously entraining mined particles from a supply of mined particles in said flow of liquid along said first path at said particles entrainment position, means for confining a flow of liquid along a second flow path from a second pumping position to said high pressure inlet and from said high pressure outlet to said remote point, second pumping means at said second pumping position for maintaining a flow of liquid along said second path, means for clarifying the liquid with mined particles smaller than said predetermined size flowing from said first pumping position to obtain a clarified liquid fraction and a liquid fraction with a concentration of said smaller mined particles, third pumping means for pumping said clarified liquid fraction into said second flow path, and means for returning the liquid fraction with a concentration of said smaller mined particles to said first flow path.

* * * * *